Patented Mar. 14, 1933

1,901,308

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE ISODIBENZANTHRONE SERIES AND METHOD OF MAKING THEM

No Drawing. Application filed December 21, 1929, Serial No. 415,780, and in Germany April 8, 1927.

This invention relates to the production of new vat dyestuffs.

We have found that new very valuable vat dyestuffs which dye cotton in most cases from dark blue to black shades are obtained by condensing isodibenzanthrones containing at least one nitrogen atom with a reactive hydrogen atom attached thereto, with polynuclear compounds containing one or more negative substituents. The latter compounds may belong to the aromatic or to the heterocyclic series. Typical examples of negative substituents are halogen atoms and nitro groups. As regards the isodibenzanthrones we prefer to start from amino-isodibenzanthrones in which, if so desired, one hydrogen atom of the amino group may be replaced by a low alkyl group such as the methyl, ethyl or propyl group. Examples of polynuclear compounds containing a negative substituent to be employed in our process are for example ms-benzdianthrones, ms-naphthodianthrones, allo-ms-naphthodianthrones, ms-anthradianthrones, dibenzanthrones, iso-dibenzanthrones, pyranthrones, dibenzo-pyrenequinones, anthraquinoneazines, flavanthrones, naphthazines, or carbazols, containing one or more negative substituents, further suitable derivatives of, for example, anthracene, anthraquinone, phenanthrene, fluorene, benzanthrone, anthanthrone, acridones such as anthraquinoneacridones, indigo, thioindigo and the like. When employing compounds containing several negative substituents, such as halogen atoms or nitro groups, all or only part of the negative substituents may be replaced by the nitrogenous isodibenzanthrone radicle.

The said dyestuffs probably correspond to the general formula

where R stands for an isodibenzanthrone radicle, $R_1$ stands for a polynuclear radicle, which may be substituted for example by further radicles of the type

and X stands for hydrogen or a lower alkyl radicle.

The condensation is preferably carried out in organic solvents or diluting media of high boiling point, such as nitrobenzene, naphthalene or quinoline, and acid-fixing agents such as the alkali metal salts of weak acids or the oxides of the alkaline earth metals, for example sodium acetate and catalysts such as copper salts are preferably added. Excellent yields of the new dyestuffs are obtained. The reaction products dissolve in concentrated sulphuric acid usually to a green solution. They give blue vats from which they dye cotton as a rule dark blue to black shades of excellent fastness.

In the above described condensation process nitro compounds of isodibenzanthrones may be used as the nitrogenous component if a reducing agent such as hydrazine hydrate or sulphur and the like be added to the reaction mixture.

The following examples will further illustrate the nature of this invention but the invention is not restricted thereto. The parts are by weight.

*Example 1*

5 parts of mono-nitro-isodibenzanthrone are boiled in 250 parts of nitrobenzene with 5 parts of sodium acetate, 2 parts of copper oxide and 4.7 parts of amino-isodibenzanthrone for 10 to 15 hours while stirring, and the reaction mass is worked up by filtration, by suction, or by distilling off the solvent, if desired under reduced pressure or with the aid of water vapor with or without the aid of reduced pressure. The resulting dyestuff which probably corresponds to the formula

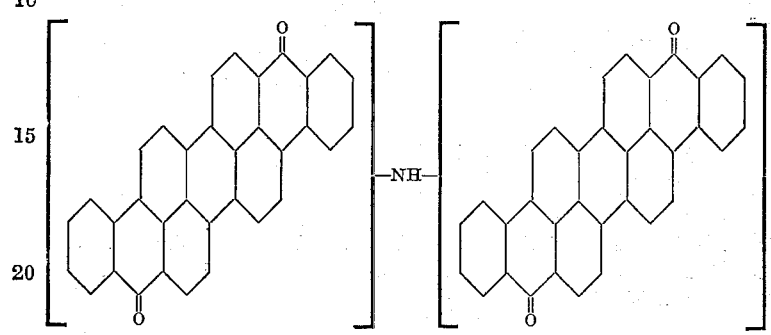

is a blue power dissolving in concentrated sulphuric acid with a green coloration and dyes cotton from a blue vat dark blue shades of excellent fastness.

*Example 2*

42 parts of trichloranthraquinone-2.1-benzacridone (obtainable by chlorinating anthraquinone-2.1-benzacridone in nitrobenzene with sulphuryl chloride in the presence of iodine) are boiled in 1000 parts of nitrobenzene with 50 parts of sodium acetate, 12 parts of copper oxide and 47 parts of monoamino-isodibenzanthrone while stirring, until unaltered amino iso-dibenzanthrone is no longer present. The resulting reaction product which is separated in the usual manner is a dark blue powder which dissolves with a green coloration in concentrated sulphuric acid and dyes the vegetable fibre dark blue shades of very good fastness from a blue vat.

*Example 3*

28 parts of 1.5-dichloranthraquinone are boiled for 10 to 15 hours in 1250 parts of naphthalene with 47 parts of monoamino-isodibenzanthrone, 12 parts of copper oxide and 50 parts of sodium acetate while stirring. The reaction product is worked up in the usual manner and a blue-black powder is obtained which dissolves in concentrated sulphuric acid with a green coloration and dyes the vegetable fibre from a blue vat dark blue shades of very good fastness.

*Example 4*

41 parts of monobrom-4.5.8.9-dibenzopyrene-3.10-quinone (obtainable by brominating 4.5.8.9-dibenzopyrene-3.10-quinone in chlorosulphonic acid) are boiled in 1000 parts of nitrobenzene after the addition of 50 parts of sodium acetate, 7 parts of copper oxide and 47 parts of monoamino-isodibenzanthrone while stirring, until the reaction product is practically free from bromine. By working up the reaction mass in the usual manner, a dark blue powder is obtained which dissolves in concentrated sulphuric acid with a green coloration and dyes the vegetable fibre from a blue vat reddish-blue shades of very good fastness.

*Example 5*

27 parts of 6.6'-dichlor-isodibenzanthrone are boiled in 1000 parts of nitrobenzene with 47 parts of amino-isodibenzanthrone, 50 parts of sodium acetate and 5 parts of copper oxide while stirring, until the reaction product is free from chlorine. The mass is worked up in the usual manner whereby a blue-black powder is obtained which probably corresponds to the formula

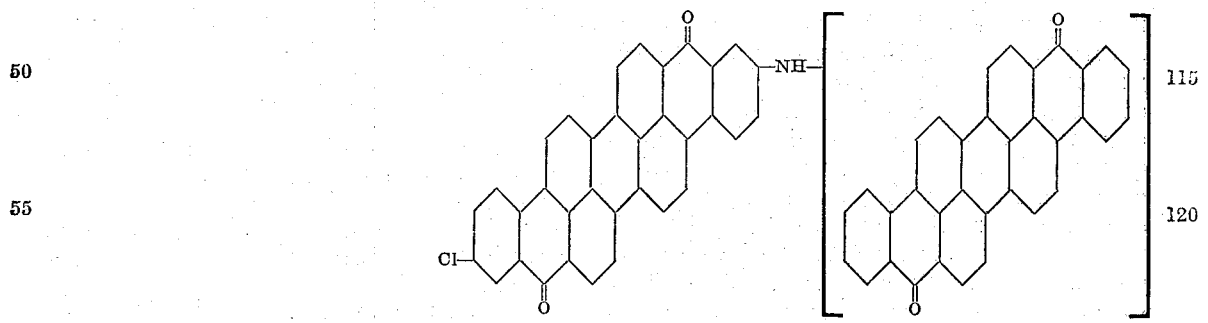

dissolves with a green coloration in concentrated sulphuric acid and dyes cotton very fast violet-blue shades from a blue vat.

*Example 6*

46 parts of dibromanthanthrone (obtainable by brominating anthanthrone in 6 per cent fuming sulphuric acid) are boiled in 1000 parts of nitrobenzene with 30 parts of sodium acetate, 9 parts of copper oxide and 94 parts of monoamino-isodibenzanthrone while stirring, until a reaction product practically free from bromine is obtained which is worked up in the usual manner. The resulting dyestuff is obtained in the form of a blue-black powder which dissolves with a green coloration in concentrated sulphuric acid and dyes cotton dark blue shades of very good fastness from a blue vat.

*Example 7*

4.7 parts of monoamino-isodibenzanthrone are boiled for 10 to 15 hours in 200 parts of α-nitronaphthalene with 2 parts of copper oxide and 5 parts of sodium acetate while stirring. The reaction product is filtered off by suction while hot. The dyestuff obtained dissolves in concentrated sulphuric acid with an olive coloration and dyes cotton grey shades from a bluish-grey vat.

*Example 8*

6 parts of dibrom-benzanthrone-pyrazolanthrone (obtainable by brominating benzanthrone-pyrazolanthrone in chlorosulphonic acid in the presence of iodine) are boiled in 350 parts of nitrobenzene with 0.5 part of copper oxide, 5 parts of sodium acetate and 4.7 parts of amino-isodibenzanthrone while stirring, until unaltered amino-isodibenzanthrone can no longer be detected. The product is worked up in the usual manner. It probably corresponds to the formula and is a dark blue powder dissolving in concentrated sulphuric acid with a yellowish-green coloration and dyes the vegetable fibre greenish-blue shades of excellent fastness from a blue vat.

*Example 9*

56 parts of 3.3′-dibrom-N.N′-dihydro-1.2.2′.1′-anthraquinoneazine are boiled in 1000 parts of nitrobenzene with 50 parts of sodium acetate, 12 parts of copper oxide and 94 parts of amino-isodibenzanthrone while stirring, until the reaction product is practically free from bromine. The mass is worked up in the usual manner and a dyestuff is obtained in the form of a blue-black powder which dissolves in concentrated sulphuric acid with a green coloration and dyes the vegetable fibre very fast dark blue shades from a blue vat.

*Example 10*

6.2 parts of dibrom-2.2′-dibenzanthronyl (obtainable by brominating 2.2′-dibenzanthronyl in chlorosulphonic acid) are boiled in 250 parts of nitrobenzene with the addition of 5 parts of sodium acetate, 2 parts of copper oxide and 4.7 parts of amino-isodibenzanthrone while stirring, until unaltered amino-isodibenzanthrone can no longer be detected. The mass is worked up in the usual manner. The resulting dyestuff dissolves in concentrated sulphuric acid with a yellowish-green coloration and dyes cotton bluish-grey shades of excellent fastness from a blue vat.

*Example 11*

5.2 parts of mono-iodo-allo-ms-naphthodianthrone (obtainable from monoamino-allo-ms-naphthodianthrone by way of the diazonium compound) are boiled while stirring in 250 parts of nitrobenzene after the addition of 5 parts of sodium acetate, 1 part of copper oxide and 4.7 parts of the product re-

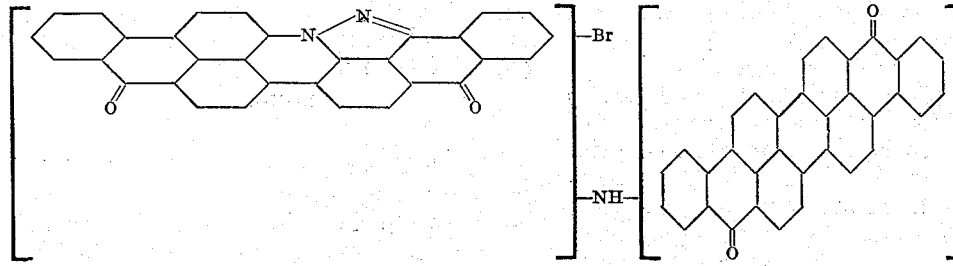

sulting from the interaction of isodibenzanthrone and hydroxylamine sulphate in sulphuric acid, until the reaction product is practically free from iodine. The mass is worked up as usual. The dyestuff obtained probably corresponds to the formula

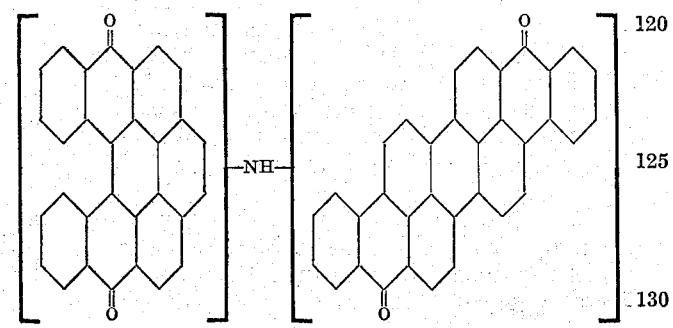

dissolves with a green coloration in concentrated sulphuric acid and dyes the vegetable fibre from a blue vat dark blue shades of excellent fastness.

*Example 12*

7.2 parts of 2.7-dibromfluorene are boiled in 250 parts of nitrobenzene with 5 parts of sodium acetate, 0.8 part of copper oxide and 9.4 parts of amino-isodibenzanthrone while stirring, until the reaction product is practically free from bromine. The mass is worked up in the usual manner, whereby a dyestuff is obtained which dissolves in concentrated sulphuric acid with a green coloration and dyes cotton from a blue vat dark blue shades of excellent fastness.

This application is a continuation in part of our copending application Ser. No. 267,478 filed April 4, 1928.

What we claim is:—

1. The process of producing vat dyestuffs which comprises condensing in the presence of a copper salt an isodibenzanthrone containing at least one nitrogen atom having a reactive hydrogen atom attached thereto with a polynuclear compound containing at least one negative substituent selected from the group consisting of halogen and nitro substituents.

2. The process of producing vat dyestuffs which comprises condensing in the presence of a copper salt an isodibenzanthrone containing at least one nitrogen atom having a reactive hydrogen atom attached thereto with a polynuclear compound containing at least one negative substituent selected from the group consisting of halogen and nitro substituents in the presence of an inert organic diluent of high boiling point.

3. The process of producing vat dyestuffs which comprises condensing in the presence of a copper salt an isodibenzanthrone containing at least one nitrogen atom having a reactive hydrogen atom attached thereto with a polynuclear compound containing at least one negative substituent selected from the group consisting of halogen and nitro substituents in the presence of an acid fixing agent.

4. The process of producing vat dyestuffs which comprises condensing an isodibenzanthrone containing at least one nitrogen atom having a reactive hydrogen atom attached thereto with a polynuclear compound containing at least one negative substituent selected from the group consisting of halogen and nitro substituents in the presence of a copper salt, of an acid-fixing agent and of an inert organic diluent of high boiling point.

5. A process for the production of valuable vat dyestuffs which comprises condensing a nitroisodibenzanthrone in the presence of a reducing agent and of a copper salt with a polynuclear compound containing at least one negative substituent selected from the group consisting of halogen and nitro substituents.

6. Dark blue to black vat dyestuffs giving bluish vats and green solutions in concentrated sulphuric acid, the said dyestuffs probably corresponding to the general formula

in which R stands for an isodibenzanthrone radicle, $R_1$ stands for the radicle of a polynuclear compound.

7. Dark blue to black vat dyestuffs giving bluish vats and green solutions in concentrated sulphuric acid, the said dyestuffs probably corresponding to the general formula

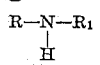

in which R stands for an isodibenzanthrone radicle, and $R_1$ for the radicle of a polynuclear compound, which is substituted by at least one further radicle of the type

8. Dark blue to black vat dyestuffs giving bluish vats and green solutions in concentrated sulphuric acid, the said dyestuffs probably corresponding to the general formula

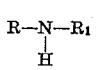

in which R stands for an isodibenzanthrone radicle, and $R_1$ for the radicle of a compound containing at least 3 condensed rings, which may be substituted by at least one further radicle of the type

9. Dark blue to black vat dyestuffs giving bluish vats and green solutions in concentrated sulphuric acid, the said dyestuffs probably corresponding to the general formula

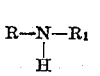

in which R stands for an isodibenzanthrone radicle, and $R_1$ for the radicle of a compound containing at least 8 condensed rings.

10. Dark blue to black vat dyestuffs giving bluish vats and green solutions in concentrated sulphuric acid, the said dyestuffs probably corresponding to the general formula

in which R stands for an isodibenzanthrone radicle, and $R_1$ for the radicle of pyranthrone.

11. Dark blue to black vat dyestuffs giving bluish vats and green solutions in concentrated sulphuric acid, the said dyestuffs probably corresponding to the general formula $$R-N-R_1$$
$$|$$
$$H$$

in which R stands for an isodibenzanthrone radicle, and $R_1$ for the radicle of benzanthronepyrazolanthrone.

In testimony whereof we have hereunto set our hands.

MAX ALBERT KUNZ.
KARL KOEBERLE.